US009817509B2

(12) United States Patent
Li et al.

(10) Patent No.: US 9,817,509 B2
(45) Date of Patent: Nov. 14, 2017

(54) METHODS AND APPARATUSES FOR PROVIDING SENSING SIGNALS FOR PROJECTED CAPACITIVE TOUCH SENSING USING A DIFFERENTIAL CURRENT MODE ANALOG CIRCUIT

(71) Applicant: Solomon Systech Limited, Hong Kong (HK)

(72) Inventors: Yin Li, Hong Kong (HK); Kin Pui Ho, Hong Kong (HK); Kut Hing Lam, Hong Kong (HK)

(73) Assignee: SOLOMON SYSTECH LIMITED, Hong Kong (HK)

( * ) Notice: Subject to any disclaimer, the term of this patent is extended or adjusted under 35 U.S.C. 154(b) by 49 days.

(21) Appl. No.: 14/927,487

(22) Filed: Oct. 30, 2015

(65) Prior Publication Data

US 2017/0123551 A1 May 4, 2017

(51) Int. Cl.
 *G06F 3/044* (2006.01)
 *G06F 3/041* (2006.01)
 *G06F 3/047* (2006.01)

(52) U.S. Cl.
 CPC ........... *G06F 3/0416* (2013.01); *G06F 3/044* (2013.01); *G06F 3/047* (2013.01); *G06F 3/0418* (2013.01)

(58) Field of Classification Search
 CPC ...................................................... G06F 3/044
 See application file for complete search history.

(56) References Cited

U.S. PATENT DOCUMENTS

| 2012/0268397 | A1  | 10/2012 | Lee et al. | |
| 2014/0035670 | A1* | 2/2014  | Chi ......................... | G09C 1/00 330/253 |
| 2016/0048755 | A1* | 2/2016  | Freyman ............... | G06N 3/063 365/185.05 |

FOREIGN PATENT DOCUMENTS

WO        2014042489 A2    3/2014

OTHER PUBLICATIONS

Heidary and Meijer, "An integrated interface circuit with a capacitance-to-voltage converter as front-end for grounded capacitive sensors", published Nov. 12, 2008, Measurement Science and Technology 20 (2009) 015202 (7pp), IOP Publishing Ltd.

(Continued)

*Primary Examiner* — Sanghyuk Park
(74) *Attorney, Agent, or Firm* — Idea Intellectual Limited; Margaret A. Burke; Sam T. Yip

(57) ABSTRACT

An analog front-end circuit comprising: a first current mode differential charge amplifier for a first sensing line, comprising: a unity gain buffer with current replication circuit, wherein the first sensing line current being fed to the unity gain buffer with current replication circuit to generate a pull up and a pull down output currents; and a current mirroring and amplification circuit, wherein the pull up and pull down output currents being fed to the current mirroring and amplification circuit to generate a positively scaled and a negatively scaled output currents; a current combining circuit for combining the positively scaled output generated for the first sensing line and a negatively scaled output current generated for a second sensing line to generate a differential current; and a differential current-to-voltage converter for converting the differential current to an output voltage usable by touch controller application.

13 Claims, 8 Drawing Sheets

(56) References Cited

OTHER PUBLICATIONS

Kim et al., "A Highly Sensitive Capacitive Touch Sensor Integrated on a Thin-Film-Encapsulated Active-Matrix OLED for Ultrathin Displays", IEEE Transactions on Electron Devices, vol. 58, Issue 10, Aug. 18, 2011, 3609-3615.

\* cited by examiner

METHODS AND APPARATUSES FOR PROVIDING SENSING SIGNALS FOR PROJECTED CAPACITIVE TOUCH SENSING USING A DIFFERENTIAL CURRENT MODE ANALOG CIRCUIT

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to touch-sensing-enabled active matrix liquid crystal display (LCD) panels (or touchscreens). In particular, the present invention relates to the capacitive touch sensing circuitry of a capacitive touchscreen.

BACKGROUND

A touch-sensing-enabled active matrix LCD display panel (or touchscreen) is an active matrix LCD panel having an additional function of detecting a location of a possible finger and/or pointing device touch made on the panel. A capacitive touchscreen comprises an insulator such as glass, coated with a transparent conductor. As the human body also conducts electricity, touching the surface of the screen results in a distortion of the screen's electrostatic field, measurable as a change in capacitance. Various technologies can then be used to detect the location of the touch point; for example, projected capacitive touch (PCT) technology.

PCT employs an X-Y (or column-row) grid of electrodes, comparable to the pixel grid in a LCD panel. A common voltage is applied on each of the column or row electrodes (the driving line), creating a uniform electrostatic field. When a conductor such as a human finger or a conductive stylus comes close to a point on the grid of electrodes, it distorts the local electrostatic field at that point, and this distortion is measurable as a change in capacitance. The capacitance change at every individual point on grid of electrodes can be measured to accurately determine the touch location by measuring the sensing signal voltage charge in the electrode of the other axis (the sensing line).

In conventional PCT type capacitive touchscreen panels, the sensing signal voltage charge is to be amplified by a voltage charge amplifier in the analog front-end circuit before it is usable by touch controller application. FIG. 1 shows a conventional voltage charge amplifier. The voltage amplification is then characterized by the following equation:

$$V_{out} = V_{ref} - \frac{R}{1+sRC}(i_{cm} + i_{noise} + i_{\Delta cm}) \quad (1)$$

where $i_{\Delta cm}$ is the sensing signal current when touch is detected; $i_{cm}$ and $i_{noise}$ are the common mode current and noise current respectively.

As can be seen in equation (1), the use of conventional voltage charge amplifier presents at least two problems:

1. The voltage headroom of the output voltage $V_{out}$ is limited by the supply voltage to the operational amplifier and the size of the integrating capacitor C. In many cases, the supply voltage attributed by the common mode and noise current occupies more than 90% of the dynamic range of the operational amplifier. This creates a poor signal-to-noise ratio (SNR) as a relatively large voltage range is used to accommodate noise, leaving only a small fraction of the voltage range for the sensing signal current $i_{\Delta cm}$.
2. The size of the integrating capacitor C is necessary to be large to attenuate the operational amplifier output voltage in order to accommodate the common mode and noise currents and the sensing signal current $i_{\Delta cm}$. This leads to a large die size for the analog front-end circuits.

SUMMARY OF THE INVENTION

The present invention provides an analog front-end circuit for enabling the capacitive touch sensing function of a capacitive touchscreen with the advantages of smaller die size of the analog front-end circuit, improved SNR, efficiency of parallel differential sensing among all sensing lines simultaneously, better common mode noise rejection, and robustness of having programmable signal current gain.

It is an objective of the present invention to provide an analog front-end circuit that processes sensing signals in current mode and allowing only the sensing signal current through its integrating capacitor. This way, a large integrating capacitor for storing excessive common mode charges is no longer required, thus the die size of the analog front-end circuit can be significantly reduced. With the noise rejected, the entire voltage range of the output voltage can be used in representing the sensing signal, improving significantly the SNR.

It is a further objective of the present invention to provide such analog front-end circuit that is applicable to mutual capacitive, self-capacitive, and hybrid capacitive touch sensors in capacitive touchscreen panels.

In accordance to various embodiments of the present invention, the analog front-end circuit comprises a current mode differential charge amplifier and a differential current-to-voltage converter. The current mode differential amplifier can logically be divided into two stages. The first stage comprises a unity gain buffer with current replication circuit. The second stage comprises a current mirroring and amplification circuit.

When applied to a PCT type capacitive touchscreen panel with mutual capacitive touch sensors, each sensing line is fed to the negative input of the unity gain buffer, and is driven by a unity gain feedback operational amplifier in the unity gain buffer, and where the positive input terminal of the unity gain feedback operational amplifier is connected to a constant reference voltage. The common mode current, which is the current from the drive line to the sense mutual capacitor, noise current, and sensing signal current (where a touch contact is made) received from the sensing line is replicated and fed to the current mirroring and amplification circuit for scaling. The current mirroring and amplification circuit generates a positively and a negatively scaled output current based on a scaling factor. The positively scaled output current is then combined with the negatively scaled output current of the adjacent sensing line. Finally, the resulting differential current is injected into the differential current to voltage converter to generate an output voltage for touch controller application.

When applied to a PCT type capacitive touchscreen panel with self-capacitive touch sensors, each sensing line is fed to the negative input of the unity gain buffer, and is driven by a unity gain feedback operational amplifier in the unity gain buffer, and where the positive input terminal of the unity gain feedback operational amplifier is connected to a toggling driving source voltage fed to the positive input of the unity gain buffer. The common mode current, which is the current from the charging and discharging of the sense self-capacitor, noise current, and sensing signal current (where a touch contact is made) received from the sensing line is replicated and fed to the current mirroring and amplification circuit for scaling. The current mirroring and amplification circuit generates a positively and a negatively scaled output current based on a scaling factor. The positively scaled output current is then combined with the negatively scaled output current of the adjacent sensing line. Finally, the resulting differential current is injected into the differential current to voltage converter to generate an output voltage for touch controller application.

Similar to the cases of PCT type capacitive touchscreen panel with mutual capacitive touch sensors and that with self-capacitive touch sensors, the present invention can be applied to a PCT type capacitive touchscreen panel with hybrid mode capacitive touch sensors with each sensing line being fed to the negative input of the unity gain buffer, and is driven by the unity gain feedback operational amplifier in the unity gain buffer, and where the positive input terminal of the unity gain feedback operational amplifier being fed in time-multiplex manner a constant reference voltage and a toggling driving source voltage.

BRIEF DESCRIPTION OF THE DRAWINGS

Embodiments of the invention are described in more detail hereinafter with reference to the drawings, in which.

DETAILED DESCRIPTION

In the following description, analog front-end circuits for enabling the capacitive touch sensing function of a capacitive touchscreen are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

Figure 1:
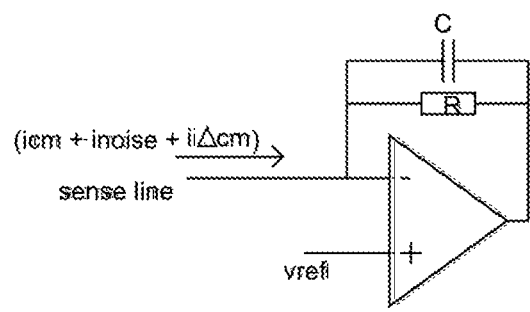
FIG. 1 shows a conventional voltage charge amplifier used traditional analog front-end circuit applied to a PCT type capacitive touchscreen panel.
Figure 2:
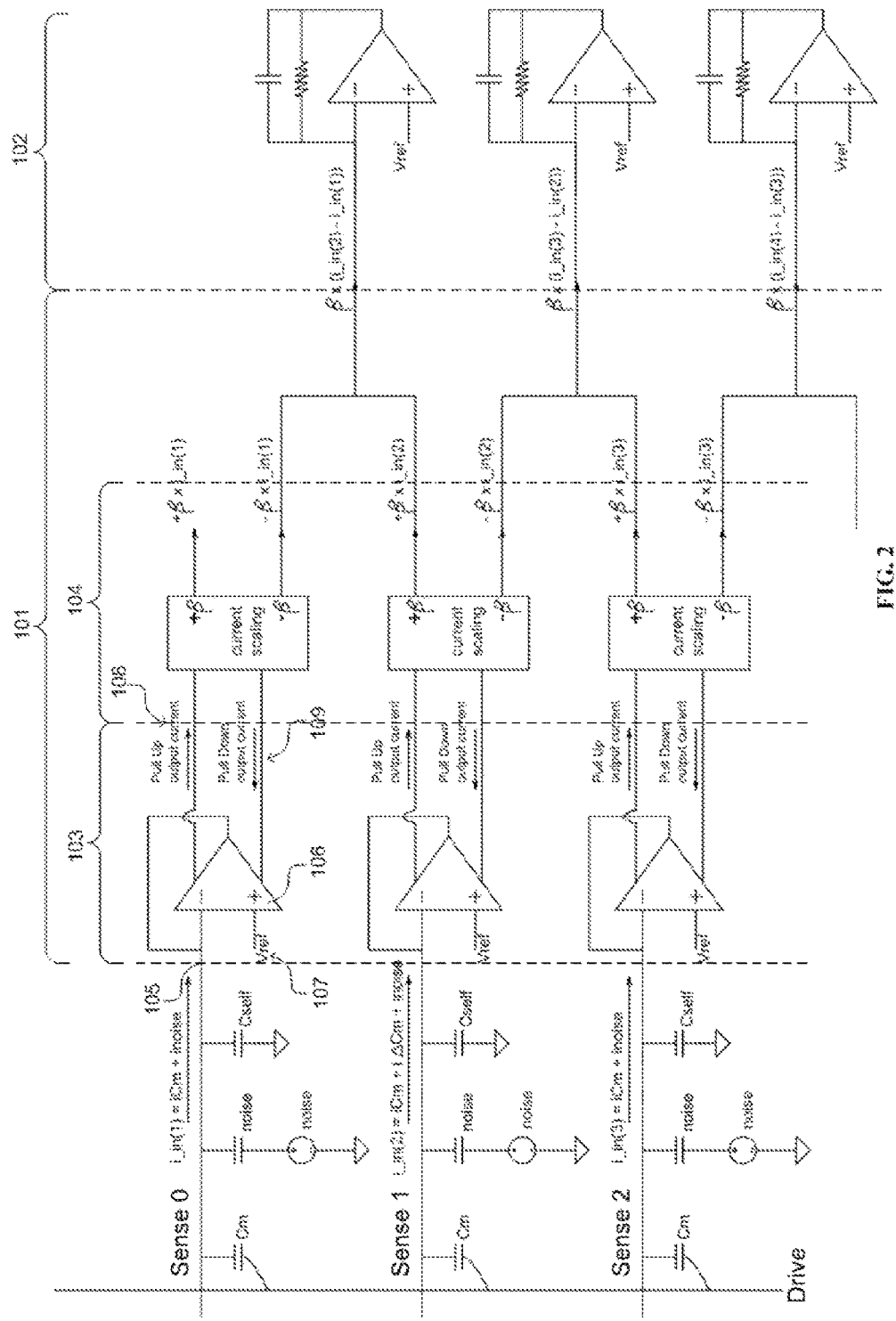
FIG. 2 shows an embodiment of an analog front-end circuit in accordance to the present invention applied to a PCT type capacitive touchscreen panel with mutual capacitive touch sensors.

Referring to FIG. 2. In accordance to various embodiments of the present invention, the analog front-end circuit comprises a current mode differential charge amplifier 101 and a differential current to voltage converter 102. The current mode differential charge amplifier 101 can logically be divided into two stages. The first stage comprises a unity gain buffer with current replication circuit 103. The second stage comprises a current mirroring and amplification circuit 104.

Still referring to FIG. 2. When applied to a PCT type capacitive touchscreen panel with mutual capacitive touch sensors, each sensing line 105 is fed to the negative input of the unity gain buffer 103, and is driven by a unity gain feedback operational amplifier 106 in the unity gain buffer 103. The positive input terminal of the unity gain feedback operational amplifier 106 is connected to a constant reference voltage 107. The common mode current $i_{cm}$, which is the current from the drive line to the sense mutual capacitor, noise current $i_{noise}$, and sensing signal current $i_{\Delta cm}$ (where a touch contact is made) combined as an input current $i_{in}$ depicted by:

$$i_{in} = i_{cm} + i_{noise} + i_{\Delta cm} \quad (2)$$

received from the sensing line 105 is replicated to generate a pull up output current 108 and a pull down output current 109 to be fed to the current mirroring and amplification circuit 104 for scaling. The current mirroring and amplification circuit 104 generates a positively and a negatively scaled output currents based on the pull up output current 108 and a pull down output current 109 scaled by a scaling factor, which are depicted by: $+\beta \times i_{in}$ and $-\beta \times i_{in}$ respectively where $\beta$ is the scaling factor. The positively scaled output current $+\beta \times i_{in}(n)$ is then combined with the negatively scaled output current of the adjacent sensing line $-\beta \times i_{in}(n-1)$ to generate a differential current $i_{diff}(m)$, depicted by:

$$i_{diff}(m) = \beta \times (i_{in}(n) - i_{in}(n-1)) \quad (3)$$

and when combined with equation (2) and in the case of a touch contact is made at line n:

$$i_{diff}(m) = \beta \times (i_{\Delta cm}(n)) \quad (3.1)$$

Finally, the resulting differential current $i_{diff}(m)$ is injected into the differential current to voltage converter 102 to generate an output voltage $V_{out}$ for touch controller application.

Figure 3:
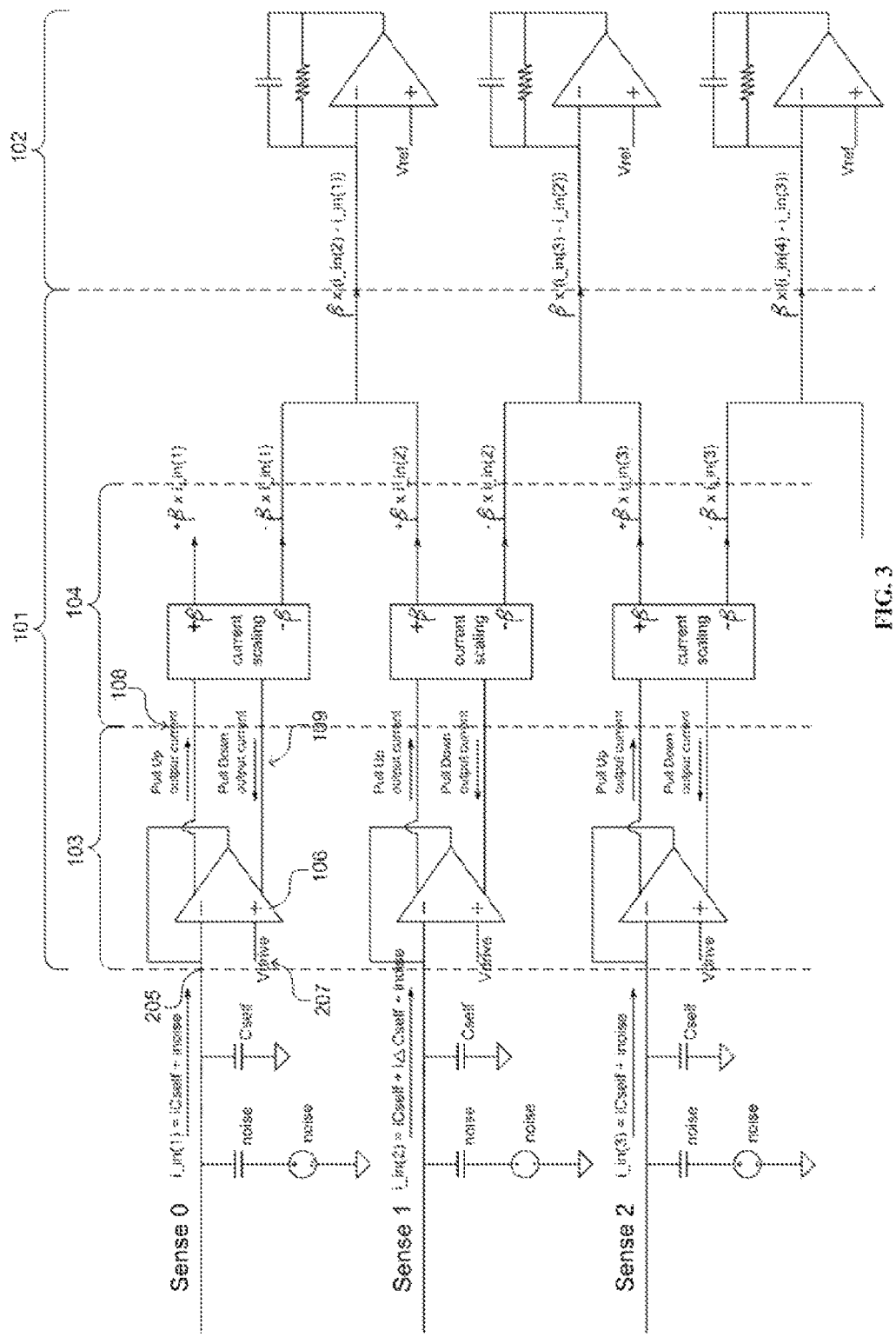
FIG. 3 shows an embodiment of an analog front-end circuit in accordance to the present invention applied to a PCT type capacitive touchscreen panel with self-capacitive touch sensors.

Referring to FIG. 3. When applied to a PCT type capacitive touchscreen panel with self-capacitive touch sensors, each sensing line 205 is fed to the negative input of the unity gain buffer 103, and is driven by a unity gain feedback operational amplifier 106 in the unity gain buffer 103. The positive input terminal of the unity gain feedback operational amplifier 106 is connected to a toggling driving source voltage 207. The common mode current $i_{Cself}$, which is the current from the charging and discharging of the sense self-capacitor, noise current $i_{noise}$, and sensing signal current $i_{\Delta cm}$ (where a touch contact is made) combined as an input current $i_{in}$ depicted by:

$$i_{in} = i_{Cself} + i_{noise} + i_{\Delta cm} \quad (4)$$

received from the sensing line 205 is replicated to generate the pull up output current 108 and the pull down output current 109 to be fed to the current mirroring and amplification circuit 104 for scaling. The current mirroring and amplification circuit 104 generates a positively and a negatively scaled output current based on the pull up output current 108 and the pull down output current 109 scaled by a scaling factor, which are depicted by: $+\beta \times i_{in}$ and $-\beta \times i_{in}$ respectively where $\beta$ is the scaling factor. The positively scaled output current $+\beta \times i_{in}(n)$ is then combined with the negatively scaled output current of the adjacent sensing line $-\beta \times i_{in}(n-1)$ to generate a differential current $i_{diff}(m)$, depicted by equation (3). Finally, the resulting differential current $i_{diff}(m)$ is injected into the differential current-to-voltage converter 102 to generate an output voltage for touch controller application.

Similar to the cases of PCT type capacitive touchscreen panel with mutual capacitive touch sensors and that with self-capacitive touch sensors, an embodiment of the present invention can be applied to a PCT type capacitive touchscreen panel with hybrid mode capacitive touch sensors with each sensing line being fed to the negative input of the unity gain buffer, and is driven by the unity gain feedback operational amplifier in the unity gain buffer, and where the positive input terminal of the unity gain feedback operational amplifier being fed in time-multiplex manner a constant reference voltage and a toggling driving source voltage.

Figure 4:
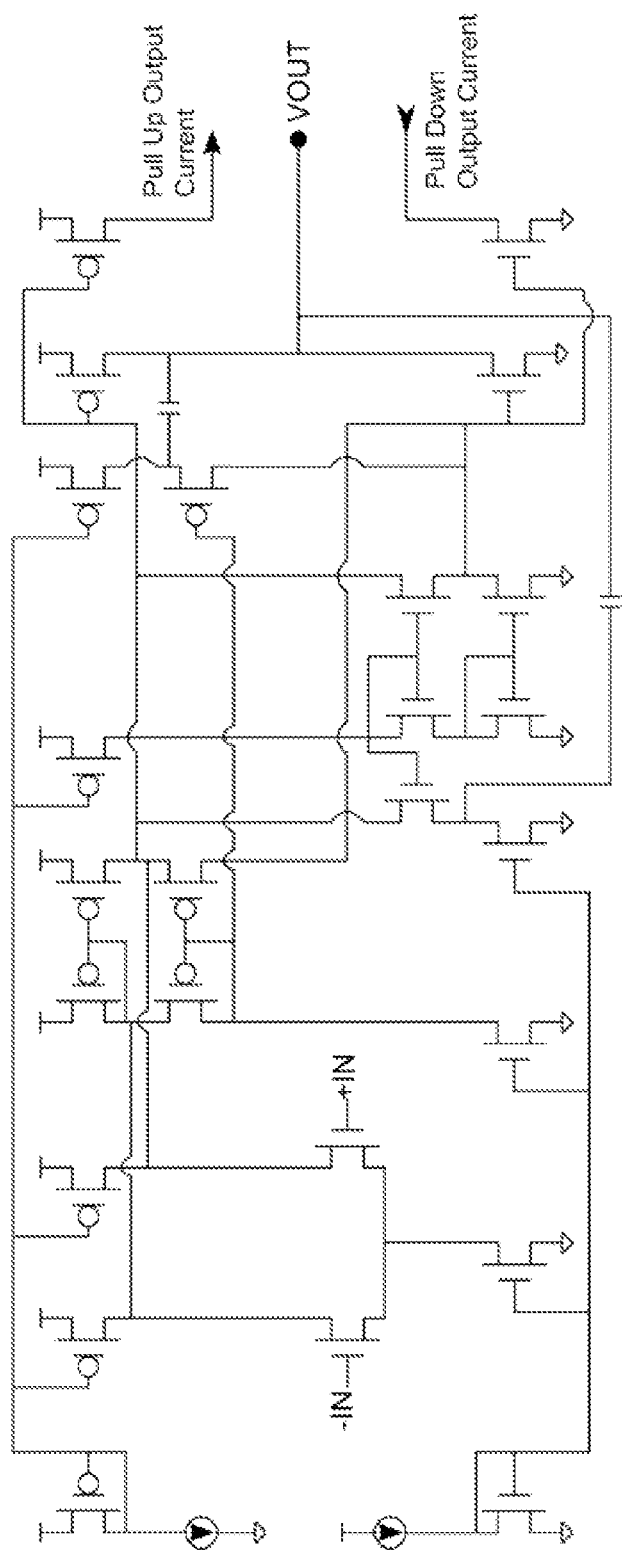
FIG. 4 shows an exemplary MOSFET circuit implementation of an embodiment of a unity gain buffer with current replication circuit in accordance to the present invention.

The unity gain buffer with current replication circuit 103 can be implemented by an exemplary MOSFET circuit as shown in FIG. 4. It shall be appreciated that an ordinarily skilled person in the art may derive other circuit implementations that achieve the same functionalities and properties of the unity gain buffer with current replication circuit in accordance to the embodiments of the present invention.

Figure 5:
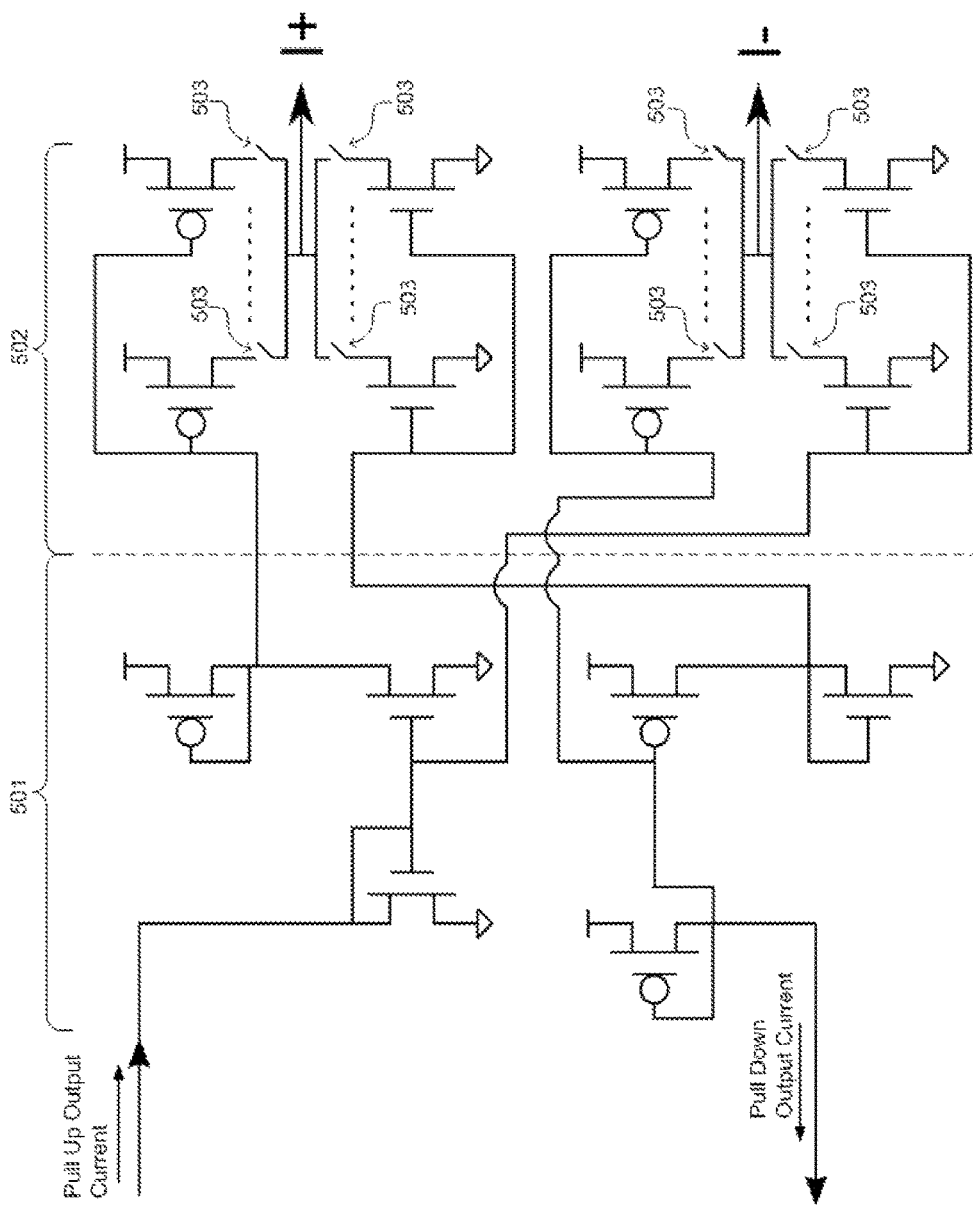
FIG. 5 shows another exemplary MOSFET circuit implementation of an embodiment of a unity gain buffer with current replication circuit in accordance to the present invention.

The current mirroring and amplification circuit 104 can be implemented by an exemplary MOSFET circuit as shown in FIG. 5. Section 501 of the circuit is to mirror the pull up output current 108 and a pull down output current 109. Section 502 of the circuit is to amplify the currents with the scaling factor adjustable by controlling the output scale switches 503.

Figure 6:
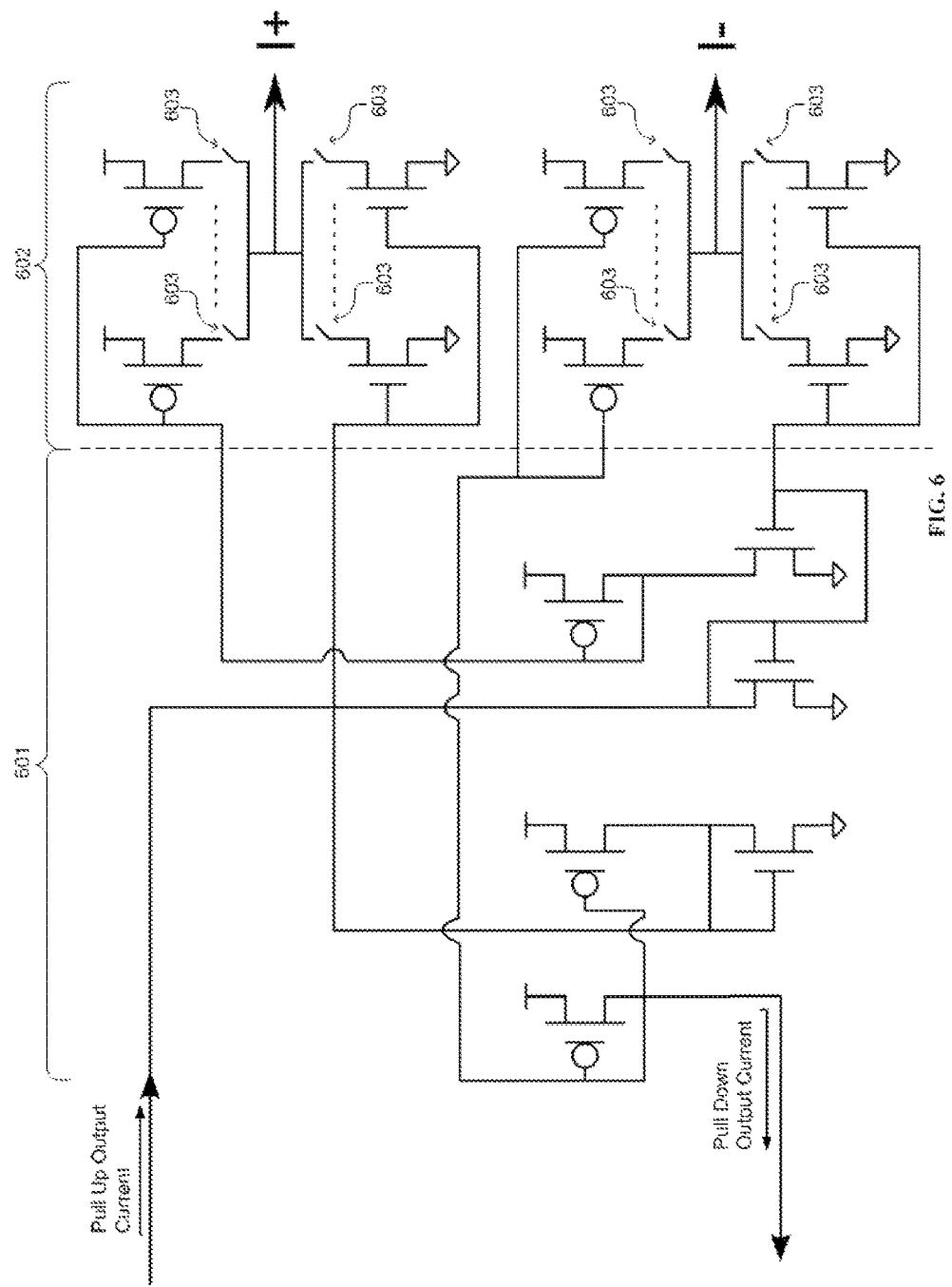
FIG. 6 shows yet another exemplary MOSFET circuit implementation of an embodiment of a unity gain buffer with current replication circuit in accordance to the present invention.

The current mirroring and amplification circuit 104 can also be implemented by another exemplary MOSFET circuit as shown in FIG. 6. Section 601 of the circuit is to mirror the pull up output current 108 and a pull down output current 109. Section 602 of the circuit is to amplify the currents with the scaling factor adjustable by controlling the output scale switches 603.

Figure 7:
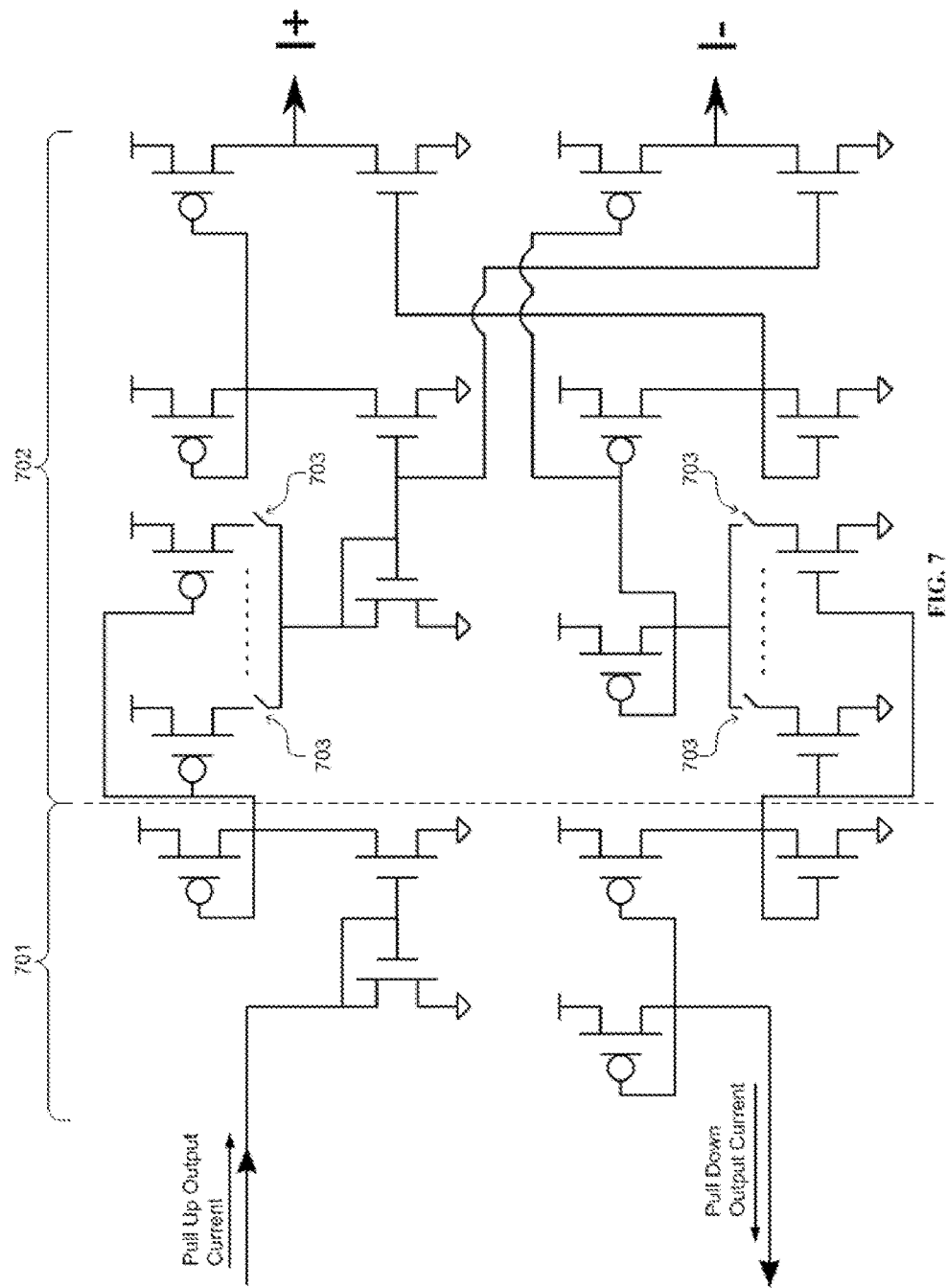
FIG. 7 shows an exemplary MOSFET circuit implementation of an embodiment of a current mirroring and amplification circuit in accordance to the present invention.

The current mirroring and amplification circuit 104 can be implemented by yet another exemplary MOSFET circuit as shown in FIG. 7. Section 701 of the circuit is to mirror the pull up output current 108 and a pull down output current 109. Section 702 of the circuit is to amplify the currents with the scaling factor adjustable by controlling the output scale switches 703.

It shall be appreciated that an ordinarily skilled person in the art may derive other circuit implementations that achieve the same functionalities and properties of the current mirroring and amplification circuit in accordance to the embodiments of the present invention.

The above-describe exemplary circuits of the current mirroring and amplification circuit allow a current gain with an adjustable scaling factor of $\beta=\frac{1}{16}$ to $\beta=2$ in steps of $\frac{1}{16}$ by the control of the output scale switches. While small current gain levels can reduce saturation and clipping during large single-ended or common-mode noisy input current condition, large current gain levels can improve the voltage headroom utilization for small sensing signal current and thus improve SNR. As such an optimal current gain is to be determined during initial configuration of the analog front-end circuit by controlling the output scale switches.

Figure 8A:
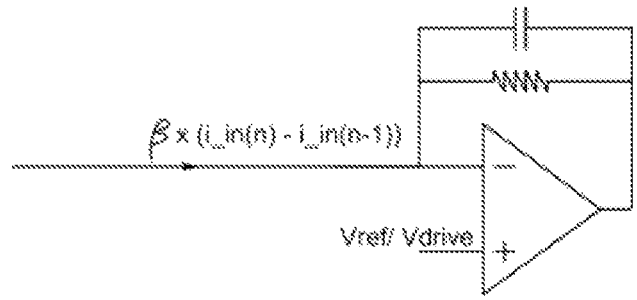
FIG. 8A shows an exemplary RC low-pass amplifier implementation of an embodiment of a differential current-to-voltage converter in accordance to the present invention.
Figure 8B:
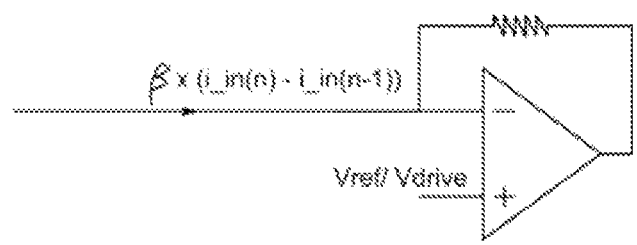
FIG. 8B shows an exemplary trans-resistance amplifier implementation of an embodiment of a differential current-to-voltage converter in accordance to the present invention.
Figure 8C:
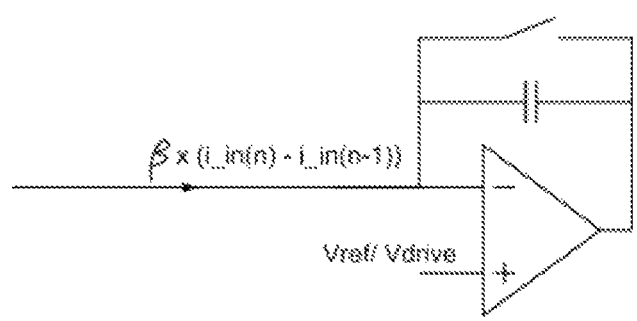
FIG. 8C shows an exemplary charge integrator implementation of an embodiment of a differential current-to-voltage converter in accordance to the present invention.

The differential current-to-voltage converter 102 can be implemented by an exemplary RC low-pass amplifier as shown in FIG. 8A, an exemplary trans-resistance amplifier as shown in FIG. 8B, or an exemplary charge integrator as shown in FIG. 8C. It shall be appreciated that an ordinarily skilled person in the art may derive other circuit implementations that achieve the same functionalities and properties of the differential current-to-voltage converter in accordance to the embodiments of the present invention.

Since the common mode and noise current components have been rejected in the differential current $i_{diff}(m)$ generation by combining the positively scaled output current $+\beta \times i_{in}(n)$ with the negatively scaled output current of the adjacent sensing line $-\beta \times i_{in}(n-1)$, the output voltage $V_{out}$ of the differential current-to-voltage converter is now:

$$V_{out} = V_{ref} - \frac{R}{1+sRC}(i_{\Delta cm}) \quad (5)$$

This relaxes the voltage headroom and allows the sensing signal current, with the configurable current gain, to occupy the full dynamic range of the operational amplifier of the differential current-to-voltage converter. This greatly improves the SNR (Experiments showed that 30 to 40 dB were achieved). Consequently, a large integrating capacitor C is no longer needed (Experiments showed that a reduction in capacitance requirement from 50 pF to 10 pF was achieved), allowing a reduction in the die size of the analog front-end circuits.

Since the differential current-to-voltage converters are available to all sensing lines simultaneously, there is no need to separate the processing of the sensing lines and reference sensing lines in two different phases and thus no sacrificing frame rate.

In practical implementation, the embodiments of the apparatus as disclosed herein may be fabricated as an integrated device or an integrated circuit.

In industrial applications, the apparatus can be made as a display driver having a function of touch sensing, or an integrated controller having functionalities of controlling image display and detecting on-screen touch. The apparatus may also be integrated in an interactive display system, a smartphone, or a tablet computer.

The various electronic embodiments of the apparatus as disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for providing a sensing signal for projected capacitive touch (PCT) sensing, comprising:
   a first current mode differential charge amplifier for a first sensing line, comprising:
      a unity gain buffer with current replication circuit, wherein the first sensing line current being fed to the unity gain buffer with current replication circuit to generate a pull up output current and a pull down output current; and
      a current mirroring and amplification circuit, wherein the pull up output current and the pull down output current being fed to the current mirroring and amplification circuit to be amplified by a current gain factor and generate a positively scaled output current and a negatively scaled output current, and wherein the current mirroring and amplification circuit comprises a current mirroring circuit configured to mirror one or more currents, and an amplification circuit configured to amplify the mirrored currents by a scaling factor adjustable by one or more scale switches;
   a current combining circuit for combining the positively scaled output current generated by the first current mode differential charge amplifier for the first sensing line and a negatively scaled output current generated by a second current mode differential charge amplifier for a second sensing line to generate a differential current; and
   a differential current-to-voltage converter for converting the differential current to an output voltage usable by touch controller application;
   wherein common mode and noise current components in the sensing lines current are removed by the current combining circuit.

2. The apparatus of claim 1, wherein the current gain factor is configurable.

3. The apparatus of claim 1, wherein the differential current-to-voltage converter being a RC low-pass amplifier.

4. The apparatus of claim 1, wherein the differential current-to-voltage converter being a trans-resistance amplifier.

5. The apparatus of claim 1, wherein the differential current-to-voltage converter being a charge integrator.

6. A PCT type capacitive touchscreen panel with mutual capacitive touch sensors, comprising the apparatus of claim 1.

7. A PCT type capacitive touchscreen panel with self-capacitive touch sensors, comprising the apparatus of claim 1.

8. A PCT type capacitive touchscreen panel with mutual-capacitive-and-self-capacitive-hybrid mode capacitive touch sensors, comprising the apparatus of claim 1.

9. A method for providing a sensing signal for PCT sensing, comprising:
   replicating a first sensing line current to generate a first pull up output current and a first pull down output current using a first unity gain buffer with current replication circuit;
   mirroring and amplifying the first pull up output current and the first pull down output current by a current gain factor using a first current mirroring and amplification circuit to generate a first positively scaled output current and a first negatively scaled output current using a first current mirroring and amplification circuit, wherein the first current mirroring and amplification circuit comprises a first current mirroring circuit configured to mirror one or more currents, and a first amplification circuit configured to amplify the mirrored currents by a first scaling factor adjustable by one or more scale switches;
   replicating a second sensing line current to generate a second pull up output current and a second pull down output current using a second unity gain buffer with current replication circuit;
   mirroring and amplifying the second pull up output current and the second pull down output current by the current gain factor using a second current mirroring and amplification circuit to generate a second positively scaled output current and a second negatively scaled output current using a second current mirroring and amplification circuit, wherein the second current mirroring and amplification circuit comprises a second current mirroring circuit configured to mirror one or more currents, and a second amplification circuit configured to amplify the mirrored currents by a second scaling factor adjustable by one or more scale switches;
   combining the first positively scaled output current and the second negatively scaled output current to eliminate the common mode and noise current components and generate a differential current; and
   converting the differential current to an output voltage usable by touch controller application using a differential current-to-voltage converter.

10. The method of claim 9, wherein the current gain factor is configurable.

11. The method of claim 9, wherein the differential current-to-voltage converter being a RC low-pass amplifier.

12. The method of claim 9, wherein the differential current-to-voltage converter being a trans-resistance amplifier.

13. The method of claim 9, wherein the differential current-to-voltage converter being a charge integrator.

* * * * *